Sept. 25, 1956    P. B. CLARK    2,764,671
LIGHTING FIXTURE

Filed May 18, 1953    2 Sheets—Sheet 1

INVENTOR.
Philip B. Clark
BY
Attorney

Sept. 25, 1956 P. B. CLARK 2,764,671
LIGHTING FIXTURE

Filed May 18, 1953 2 Sheets-Sheet 2

INVENTOR.
Philip B. Clark
BY
Attorney

United States Patent Office 2,764,671
Patented Sept. 25, 1956

2,764,671

LIGHTING FIXTURE

Philip B. Clark, South Milwaukee, Wis., assignor to McGraw Electric Company, Milwaukee, Wis., a corporation of Delaware Application May 18, 1953, Serial No. 355,631

5 Claims. (Cl. 240—1.2)

This invention relates to a lighting fixture, and more particularly to a light projector intended for use as a signalling or marker light of an airfield.

It is an object of the present invention to provide a light fixture which may be elevated above ground level and supported on an anchoring means by means of a unitary flexible structure comprising a protective and reflecting circumferential apron, a lens retaining portion, a lamp socket and a fastening portion, all of which may be molded as an integral unit from a resilient plastic material such as rubber or synthetic rubber.

It is a further object of this invention to provide a portable mounting structure for a lighting fixture, which is designed to releasably support and retain conventional projector lamps and lenses, and which may be manufactured from a flexible material as a unitary structure adapted for releasable engagement with an elevated stationary mounting means, such as a U-shaped wicket.

It is a further object of this invention to provide a mounting structure for a light projector, which is of a unitary nature and comprises a resilient material which may be molded to form fastening means, receptacles for lenses and projector lamps, and have imbedded therein all of the necessary electrical connecting devices for providing a portable unit which may be set up in the field and operated from an available electrical supply.

It is still another object of this invention to provide a unitary lamp mounting device, which may be inexpensively and facilely manufactured from readily available materials, and which may be conveniently broken down for ease in storing and installing.

Figure 1:
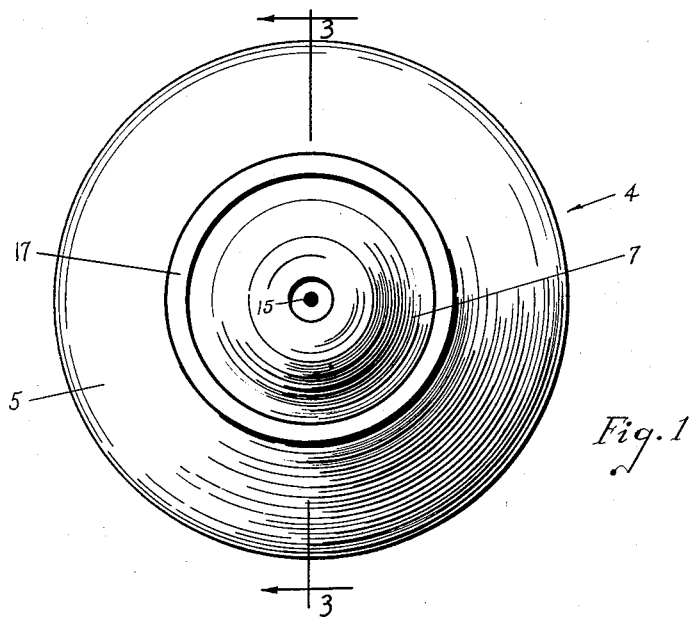
Fig. 1 is a top plan view of the unitary mounting structure, with the lens and lamp removed.

The light fixture includes a conventional projector lamp 1 and a light projecting lens 2, which may be in the conventional form of a fresnel, dome shaped, structure of glass or transparent plastic, and including annular refracting prisms 3. Although not shown herein, the device may be easily modified to include additional concentric lens members interiorly of the lens 2. Both the lamp 1 and the lens 2 are releasably retained by the unitary mounting device, generally denoted by the reference character 4. The mounting device is preferably molded from a single piece of resilient plastic, such as rubber, or a synthetic rubber for the purposes hereinafter described.

Figure 2:
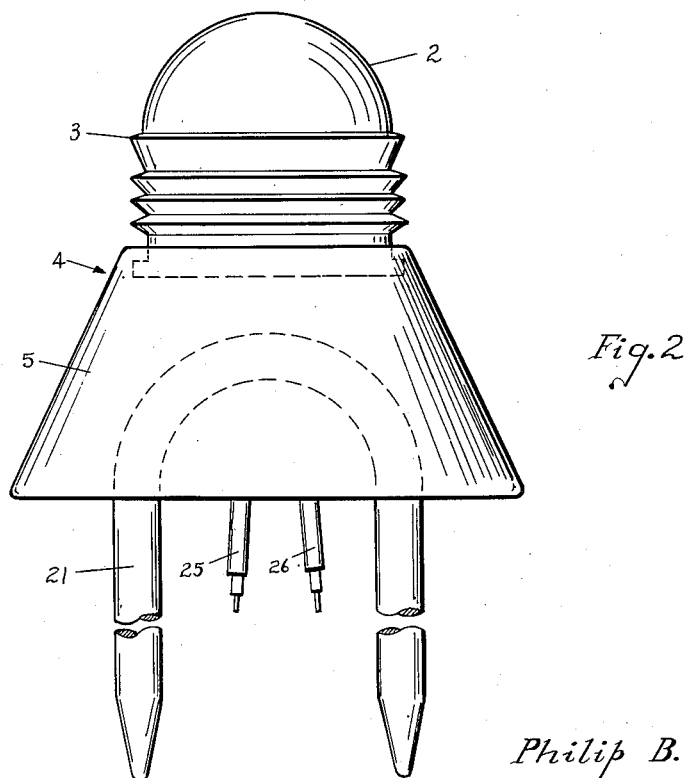
Fig. 2 is a side elevation of the device showing the lens in place, with the assembly being supported by a U-shaped wicket.
Figure 3:
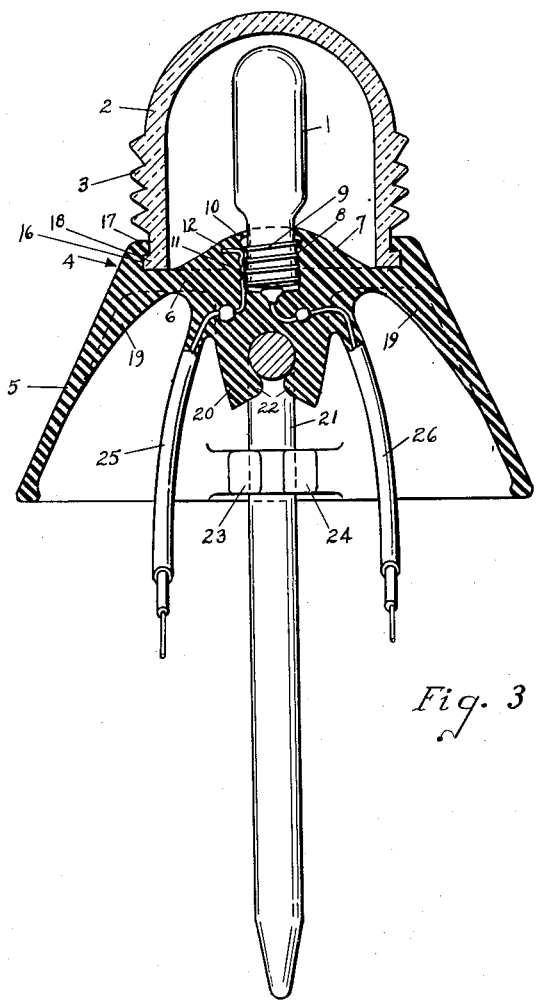
Fig. 3 is a cross sectional view of the fixture taken along line 3—3 of Fig. 1, and rotated on its axis approximately 90° from the view of Fig. 2.

The mounting device includes an apron portion 5, preferably conical in form and tapering outwardly from the top as viewed in Figs. 2 and 3. The supporting base portion 6 is contoured upwardly at its center to provide a lamp supporting portion 7, and preferably includes an integrally threaded socket 8 adapted to receive the complementary threads of the conducting base portion 9 of a conventional projector lamp 1. The lamp supporting portion 7 is further provided with an overhanging lip 10, providing an annular weather-tight seal on engagement with the periphery of the lamp 1. A contact member 11 is preferably imbedded in the base 6 as an insert during molding, and includes a retaining arm 12 bent to firmly engage with the plastic material to prevent endwise movement of the member. The contact 11 is preferably corrugated in form, as shown, and is complementary engageable with the threads of the conducting base 9 to provide electrical contact. The projector lamp 1 also electrically engages a contact 15 (see Fig. 1), which is preferably seated as an insert during molding and positioned at the lower portion of the opening 8. It will be understood that the socket is not to be limited to threading engagement with the projector lamp, but may include a conventional stamped socket member (not shown) or a bayonet receptacle for lamps of that design (not shown). The integrally molded threads are, however, easily formed and relatively less expensive than to provide additional socket members.

The base portion 6 of the mounting device 4 is provided with an annular groove 16 defined by a marginal flange 17, providing a retaining means and weather-tight seal for the complementary annular flange 18 of the lens 3.

A plurality of circumferentially spaced web portions 19 are molded integrally with the mounting device on the opposite surface of the base portion 6 from the lens retaining groove 16. These web portions, in addition to supporting the apron 5, act as a fulcrum for inserting and removing the lens 3 from the annular groove 16. That is, mere hand pressure, with the fingers resting at diametrically opposed web portions will provide a lever action to distend the opening defined by the marginal flange 17 for receiving or removing the lens when replacing burnt out projector lamps, or other routine maintenance operations.

An integral resilient retaining clip 20 is positioned centrally of the base 6 and extending downwardly for engagement with a mounting stake or wicket 21. The resilient clip 20 is provided with a contour having retaining shoulder portions 22 for engagement with the bail of the U-shaped wicket 21. Inwardly extending resilient retaining members 23 and 24 are molded integrally with the inner surface of the flared apron 5, and are arranged to releasably embrace the parallel arms of the anchoring U-shaped wicket 21. The lower portions of the wicket are preferably tapered to permit ease in insertion of the member in hard ground.

A convenient means of providing electrical connection to the light fixture may be made with conductors 25 and 26 imbedded in an insulating material substantially the same as the material of the mounting device 4. The conductors are bonded at either side of the clip under conventional bonding practice, or may be molded directly, if so desired. The conductors 25 and 26 are electrically connected to the contacts 11 and 15, respectively, and are adapted for connection with a conventional electrical supply circuit (not shown).

Light fixtures of the nature described are generally installed on airports for the guidance of aircraft pilots during landing or take-off operations. However, it will be obvious that the structure may be readily installed as markers for streets or highways, especially during periods of emergencies or construction. The presently described invention is particularly adaptable for use where portability is desired, as for instance in privately owned landing strips where guide signals are essential, but cost is a major deterrant to the purchase of prior light projectors.

The present invention provides an inexpensive, unitary structure, which may be fabricated with all of its integral operating parts being molded or otherwise bonded together as a unit. It may be entirely dismantled or assembled in the field without auxiliary tools, and may be electrically connected to conventional household circuits or to storage batteries where so desired.

I claim:

1. In a lighting fixture including a lamp, a lens, and a supporting anchor having a mounting portion, the combination with a unitary structure comprising a mounting device of resilient material having a base defining a lamp-receiving socket, contact members in said socket for electrically engaging said lamp, releasable retaining means for said lens, an apron member extending peripherally of said base and being fully suspended radially relative thereto, conducting lead members imbedded in said mounting device and electrically connected to said contact members, and an integral anchor retaining means including an integral resilient clip member having opposed gripping surfaces adapted to releasably embrace the mounting portion of said supporting anchor.

2. In a lighting fixture including a lamp, a lens, and a supporting anchor having a mounting portion, the combination with a unitary structure comprising a mounting device of resilient material having a base defining a lamp-receiving socket, contact members in said socket for electrically engaging said lamp, an annular flange and groove for releasable sealing engagement with said lens, an apron member extending peripherally of said base and being fully suspended radially relative thereto, and anchor retaining means including an integral resilient clip member having opposed gripping surfaces adapted to releasably embrace the mounting portion of said supporting anchor.

3. In a lighting fixture including a lamp, a lens, and a supporting anchor having a mounting portion, the combination with a unitary structure comprising a mounting device of resilient material having a base defining a lamp-receiving socket, contact members in said socket for electrically engaging said lamp, an annular flange and groove for releasable sealing engagement with said lens, an apron member extending peripherally of said base and being fully suspended radially relative thereto, conducting lead members imbedded in said mounting device and electrically connected to said contact members, and an anchor retaining means including an integral resilient clip member having opposed gripping surfaces adapted to releasably embrace the mounting portion of said supporting anchor.

4. In a lighting fixture including a lamp, a lens, and a U-shaped supporting anchor having parallel legs extending from a transverse bar portion, the combination with a molded unitary structure comprising a mounting device of resilient material having a base defining a lamp-receiving socket, contact members in said socket for electrically engaging said lamp, an annular flange and groove for releasable sealing engagement with said lens, an outwardly extending circumferential conical apron fully suspended relative to said base, circumferentially spaced web portions interposed between said base and said apron and comprising fulcrum means for distending said flange on normal pressure of said apron, radially inwardly adjacent the margin thereof, whereby said arrangement provides leverage for expanding said flange for insertion and removal of said lens, and anchor retaining means consisting of spaced integral resilient clip members arranged to individually releasably embrace the transverse bar portion and each of the parallel legs of said supporting anchor.

5. In a lighting fixture including a lamp, a lens, and a U-shaped supporting anchor having parallel legs extending from a transverse bar portion, the combination with a molded unitary structure comprising a mounting device of resilient material having a base defining a socket having integral threaded portions for threadingly receiving said lamp, contact members in said socket for electrically engaging said lamp, an annular flange and groove for releasable sealing engagement with said lens, an outwardly extending circumferential conical apron freely suspended relative to said base, circumferentially spaced web portions interposed between said base and said apron and comprising fulcrum means for distending said flange on normal pressure of said apron, radially inwardly adjacent the margin thereof, whereby said arrangement provides leverage for expanding said flange for insertion and removal of said lens, conducting lead members imbedded in said mounting device and electrically connected to said contact members, and anchor retaining means consisting of spaced integral resilient clip members arranged to individually releasably embrace the transverse bar portion and each of the parallel legs of said supporting anchor.

References Cited in the file of this patent

UNITED STATES PATENTS

| 1,388,267 | Kneip | Aug. 23, 1921 |
| 1,637,551 | Clausing | Aug. 2, 1927 |
| 1,876,082 | Shaw et al. | Sept. 6, 1932 |
| 2,035,081 | Lower | Mar. 24, 1936 |
| 2,099,444 | Langdon | Nov. 16, 1937 |
| 2,277,468 | Welch | Mar. 24, 1942 |
| 2,332,362 | Bartow | Oct. 19, 1943 |

FOREIGN PATENTS

| 69,529 | Netherlands | Feb. 15, 1952 |